United States Patent
Goldstein et al.

(10) Patent No.: US 12,457,228 B2
(45) Date of Patent: Oct. 28, 2025

(54) MALWARE ACTIVITY DETECTION FOR NETWORKED COMPUTING SYSTEMS

(71) Applicant: Microsoft Technology Licensing, LLC, Redmond, WA (US)

(72) Inventors: Eran Goldstein, Herzliya (IL); Idan Hen, Tel Aviv (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 252 days.

(21) Appl. No.: 17/825,509

(22) Filed: May 26, 2022

(65) Prior Publication Data
US 2023/0412616 A1   Dec. 21, 2023

(51) Int. Cl.
H04L 9/40        (2022.01)

(52) U.S. Cl.
CPC ...... H04L 63/1425 (2013.01); H04L 63/1416 (2013.01); H04L 63/145 (2013.01)

(58) Field of Classification Search
CPC ............ H04L 63/1425; H04L 63/1416; H04L 63/145
See application file for complete search history.

(56) References Cited

U.S. PATENT DOCUMENTS

| | | | |
|---|---|---|---|
| 9,654,485 B1 * | 5/2017 | Neumann | H04L 63/1416 |
| 9,825,976 B1 | 11/2017 | Gomez et al. | |
| 10,893,059 B1 * | 1/2021 | Aziz | H04L 63/14 |
| 12,088,611 B1 * | 9/2024 | Lin | H04L 63/20 |
| 12,199,997 B1 * | 1/2025 | Lin | H04L 41/22 |

(Continued)

FOREIGN PATENT DOCUMENTS

WO   2015127472 A2   8/2015

OTHER PUBLICATIONS

Kapil, Divya; Mehra, Nidhi; Gupta, Atika; Maurya, Sudhanshu; Sharma, Anupriya; "Network Security: Threat Model, Attacks, and IDS Using Machine Learning," International Conference on Artificial Intelligence and Smart Systems (ICAIS), Coimbatore, India, Mar. 25-27, 2021, pp. 203-208.*

(Continued)

*Primary Examiner* — Victor Lesniewski
(74) *Attorney, Agent, or Firm* — Weaver IP L.L.C.

(57) ABSTRACT

Malware activity detection for networked computing systems is described. A network session record is provided to a machine learning (ML) model configured to generate an indication of whether the provided network session record evidences malware activity. The network session record indicates network traffic activity in a time period. Responsive to an indication by the ML model, correlation scores are calculated by, for each process session record in a process session record set, calculating a correlation score indicative of a correlation between the provided network session record and the process session record. Each process session record in the process session record set corresponds to a process executed by a computing device in the time period. A determination that a correlation score indicates a corresponding process session record is indicative of the evidenced malware activity is made. Responsive to the determination, a malware activity alert is generated.

20 Claims, 7 Drawing Sheets

(56) References Cited

U.S. PATENT DOCUMENTS

| | | | |
|---|---|---|---|
| 2015/0128263 A1* | 5/2015 | Raugas | G06F 21/552 |
| | | | 726/23 |
| 2015/0304350 A1* | 10/2015 | Lin | H04L 63/02 |
| | | | 726/23 |
| 2017/0244731 A1* | 8/2017 | Hu | H04L 63/1425 |
| 2018/0316708 A1* | 11/2018 | Strong | H04L 43/04 |
| 2019/0089725 A1* | 3/2019 | Anachi | G06N 20/00 |
| 2019/0166144 A1 | 5/2019 | Mirsky et al. | |
| 2019/0222601 A1* | 7/2019 | Bardenstein | H04L 63/1408 |
| 2020/0195683 A1* | 6/2020 | Kuppa | H04L 63/1441 |
| 2020/0304529 A1* | 9/2020 | Fehrman | H04L 63/0236 |
| 2020/0358792 A1* | 11/2020 | Bazalgette | G06N 20/00 |
| 2021/0021641 A1* | 1/2021 | Anderson | G06F 18/24155 |
| 2021/0029013 A1* | 1/2021 | Cova | H04L 43/16 |
| 2021/0067531 A1* | 3/2021 | Meir | G06N 20/00 |
| 2021/0110282 A1* | 4/2021 | McCann | H04L 63/1416 |
| 2021/0133323 A1* | 5/2021 | Shin | G06F 21/554 |
| 2021/0360015 A1* | 11/2021 | Mammadli | H04L 63/1466 |
| 2022/0070195 A1* | 3/2022 | Sern | G06N 3/045 |
| 2023/0362177 A1* | 11/2023 | Graves | G06N 20/20 |

OTHER PUBLICATIONS

Klymash, Mykhailo; Shpur, Olga; Peleh, Nazar; Maksysko, Oksana; "Concept of Intelligent Detection of DDoS Attacks in SDN Networks Using Machine Learning," IEEE International Conference on Problems of Infocommunications. Science and Technology (PIC S&T), Kharkiv, Ukraine, Oct. 6-9, 2020, pp. 609-612.*

Hagos, Desta Haileselassie; Yazidi, Anis; Kure, Øivind; Engelstad, Paal E.; "Enhancing Security Attacks Analysis Using Regularized Machine Learning Techniques," IEEE 31st International Conference on Advanced Information Networking and Applications (AINA), Taipei, Taiwan, Mar. 27-29, 2017, pp. 909-918.*

"International Search Report and Written Opinion Issued in PCT Application No. PCT/US23/020093", Mailed Date: Aug. 1, 2023, 9 Pages.

Communication under Rule 71(3) EPC Received for European Application No. 23726697.8, mailed on Aug. 22, 2025, 05 pages.

* cited by examiner

MALWARE ACTIVITY DETECTION FOR NETWORKED COMPUTING SYSTEMS

BACKGROUND

Cloud computing refers to the on-demand availability of computer system resources, especially data storage (e.g., cloud storage) and computing power, without direct active management by the user. Cloud computing platforms (the networked system of processors and storage devices that provide such hardware and application services on-demand) offer higher efficiency, greater flexibility, lower costs, and better performance for applications and services relative to "on-premises" servers and storage. Accordingly, users are shifting away from maintaining applications, services, and data at local premises, and are migrating to cloud computing platforms maintained at remote premises. This migration has gained the interest of malicious adversaries, such as hackers. A hacker attempts to gain access to valid subscriptions and user accounts maintained at a cloud computing platform in an attempt to steal and/or hold ransom sensitive data or leverage the massive amount of computing resources for their own malicious purposes.

For instance, a malicious actor (at a computing device) may deploy malware to a computing resource of a cloud computing platform and may attempt to interact with the malware through a network communication channel (e.g., a command-and-control (CNC) channel). The deployed malware typically attempts to establish and transmit data over the network communication channel in a manner that evades detection. In some cases, malware may use a periodic mechanism for initializing a network communication channel, called "malware beaconing".

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods are described herein for malware activity detection in networked computing systems. A network session record is received at a machine learning (ML) model. The network session record is indicative of network traffic activity in a computing network during a time period. The ML model is configured to generate an indication of whether the provided network session record evidences malware activity. In response to an indication by the ML model that the network session record evidences malware activity, correlation scores are calculated by, for each process session record in a process session record set, calculating a correlation score indicative of a correlation between the provided network session record and the process session record. Each process session record in the process session record set corresponds to a process executed by a computing device in the computing network during the time period. A determination is made that a correlation score indicates a corresponding process session record is indicative of the evidenced malware activity. A malware activity alert is generated in response to determining that a correlation score indicates a corresponding process session record is indicative of the evidenced malware activity.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
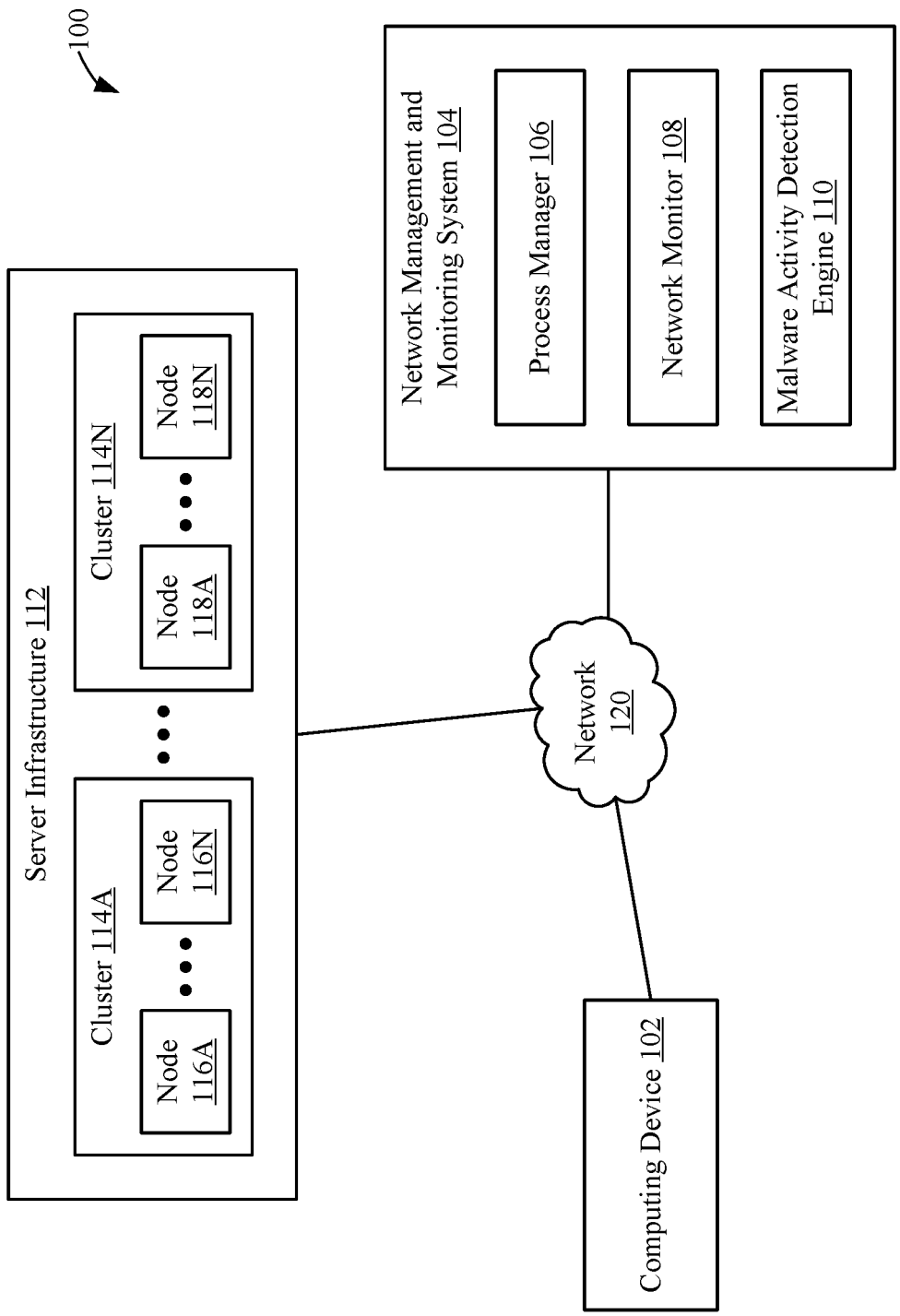
FIG. 1 is a block diagram of an example networked computing system configured to perform malware activity detection for networked computing systems, in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous exemplary embodiments are now described. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Systems and Methods for Malware Activity Detection

Networked computing systems, such as computing systems operating in a cloud computing platform, may provide various types of services that differ from each other in terms of usability (e.g., trigger-based, scheduled/manual usage) and application purpose, which dictates the type of resources they are allowed to access and operations they are allowed to perform. Example types of hardware resources in a networked computing system include a computing device, a storage device, a networking device (e.g., a switch, a router, etc.), and a server, while examples of software resources in a networked computing system include an operating system (OS), a virtual machine, a database, and an application. If a malicious actor (e.g., a hacker) compromises a resource in the networked computing system, such malicious actor may be able to execute operations that have a high impact from a security standpoint, such as accessing sensitive data or performing sensitive actions.

As discussed in the Background section, a malicious actor may deploy malware to a computing resource in their attempt to gain illicit access to resources. The malicious actor may interact with the malware through a network communication channel (e.g., a command-and-control (CNC) channel) established between the two. The malware may try to establish the network communication channel until success and in a manner to avoid detection. For instance, an obfuscated initialization routine may be executed so that the malware may initiate the connection with the external malicious actor without being noticed. Furthermore, once the channel is established, the malware may transmit covert data over the channel "piggybacked" on benign traffic in the hopes of being unnoticed. In some cases, malware may use a periodic mechanism for initializing a network communication channel, called "malware beaconing". Such malware beaconing, if detected, is evidence of the presence of malware. However, many valid operations within a cloud computing network are performed periodically, making it difficult to distinguish the malware beaconing activity from benign periodic activity.

Embodiments described herein are directed to malware activity detection for networked computing systems. In particular, systems, methods, and apparatuses, and computer program products perform malware activity detection based on network sessions and process sessions indicative of network activity in the networked computing system. A malware detection system may evaluate whether a network session record evidences malware activity and consider whether a process session record correlated to the network session record indicates the evidenced malware activity. In this context, potential malware activity can be identified and steps to mitigate the malware activity can be taken to improve performance.

Malware activity may be detected in these and further ways, in embodiments. For instance, FIG. 1 shows a block diagram of an example networked computing system 100 ("system 100" hereinafter) configured to perform malware activity detection for networked computing systems, in accordance with an embodiment. As shown in FIG. 1, system 100 includes a computing device 102, a network management and monitoring system 104, and a server infrastructure 112. Network management and monitoring system 104 includes a process manager 106, a network monitor 108, a malware activity detection engine 110. Computing device 102, process manager 106, network monitor 108, malware activity detection engine 110, and server infrastructure 112 are communicatively coupled via network 120. Network 120 may comprise one or more networks such as local area networks (LANs), wide area networks (WANs), enterprise networks, the Internet, etc., and may include one or more of wired and/or wireless portions. The features of system 100 are described in detail as follows.

Server infrastructure 112 may be a network-accessible server set (e.g., a cloud-based environment or platform). As shown in FIG. 1, server infrastructure 112 includes clusters 114A and 114N. Each of clusters 114A and 114N may comprise a group of one or more nodes (also referred to as compute nodes) and/or a group of one or more storage nodes. For example, as shown in FIG. 1, cluster 114A includes nodes 116A-116N and cluster 114N includes nodes 118A-118N. Each of nodes 116A-116N and/or 118A-118N are accessible via network 120 (e.g., in a "cloud-based" embodiment) to build, deploy, and manage applications and services. Any of nodes 116A-116N and/or 118A-118N may be a storage node that comprises a plurality of physical storage disks that are accessible via network 120 and is configured to store data associated with the applications and services managed by nodes 116A-116N and/or 118A-118N.

In an embodiment, one or more of clusters 114A and/or 114N may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 114A and/or 114N may be a datacenter in a distributed collection of datacenters. In accordance with an embodiment, system 100 comprises part of the Microsoft® Azure® cloud computing platform, owned by Microsoft Corporation of Redmond, Washington, although this is only an example and not intended to be limiting.

Each of node(s) 116A-116N and 118A-118N may comprise one or more server computers, server systems, and/or computing devices. Each of node(s) 116A-116N and 118A-118N may be configured to execute one or more software applications (or "applications") and/or services and/or manage hardware resources (e.g., processors, memory, etc.), which may be utilized by users (e.g., customers) of the network-accessible server set. Node(s) 116A-116N and 118A-118N may also be configured for specific uses. For example, any of nodes 116A-116N and/or 118A-118N may be configured to execute services of network management and monitoring system 104, as described further below.

A user may be enabled to utilize the applications and/or services (e.g., process manager 106, network monitor 108, and/or malware activity detection engine 110) offered by the network-accessible server set via computing device 102. For example, a user may be enabled to utilize the applications and/or services offered by the network-accessible server set by signing-up with a cloud services subscription with a service provider of the network-accessible server set (e.g., a cloud service provider). Upon signing up, the user may be given access to a portal of server infrastructure 112, not shown in FIG. 1. A user may access the portal via computing device 102 (e.g., by a browser application executing thereon). For example, the user may use a browser executing on computing device 102 to traverse a network address (e.g., a uniform resource locator) to a portal of server infrastructure 112, which invokes a user interface (e.g., a web page) in a browser window rendered on computing device 102. Computing device 102 may be any type of computing device, including a mobile computing device (e.g., a Microsoft® Surface® device, a laptop computer, a notebook computer, a tablet computer such as an Apple iPad™, a netbook, etc.) or a stationary computing device such as a desktop computer or PC (personal computer), although these examples are not intended to be limiting.

A user may utilize the portal to perform various operations with respect to resources in the network-accessible server set. Such operations include, but are not limited to, allocating, modifying, and/or deallocating network-based resources, building, managing, monitoring, and/or launching applications (e.g., ranging from simple web applications to complex cloud-based applications), configuring one or more of node(s) 116A-116N and 118A-118N to operate as a particular server (e.g., a database server, OLAP (Online Analytical Processing) server, etc.), sending e-mails to another user, etc. Examples of network-based resources include, but are not limited to virtual machines, storage disks (e.g., maintained by storage node(s) of server infrastructure 112), web applications, database servers, data objects (e.g., data file(s), table(s), structured data, unstructured data, etc.) stored via the database servers, etc. The portal may be configured in any manner, including being configured with any combination of text entry, for example, via a command line interface (CLI), one or more graphical user interface (GUI) controls, etc., to enable user interaction.

Network management and monitoring system 104 is configured to manage at least some of the processes executed in system 100, monitor network traffic of system 100, and detect malware activity in system 100. In accordance with an embodiment, network management and monitoring system 104 includes one or more computing devices, which may be external to server infrastructure 112, and process manager 106, network monitor 108 and/or malware activity detection engine 110 are incorporated as services executed by the one or more computing devices. Alternatively, network management and monitoring system 104 and associated services are executed by nodes 116A-116N and/or nodes 118A-118N of server infrastructure 112.

Process manager 106 may be configured to generate a log (also referred to as a "process creation event log") each time a user creates a process to be executed with respect to a network resource of system 100. The process creation log may be stored in one or more storage nodes of server infrastructure 112 and/or in a data storage external to server infrastructure 112. Each process creation event log may include a record of the process execution during a given time period, along with other characteristics associated with the process. For example, each process creation event log may include metadata descriptive of the process execution. The metadata may include information related to the process, including an indication of the service that executed the process, a name of the process, a current directory of the networked computing system, a resource the process was executed in (including an identifier of the resource), a network address from which the process was executed (e.g., the network address associated with the resource the process was executed in), an application identifier that identifies an application from which the process creation event was issued, a user identifier associated with a user that issued the process creation event, processes related to the executed process (e.g., a parent process, children processes, and/or other associated processes), a type of entity that issued the process creation event, a type of authentication scheme utilized by the entity that issued the process creation event, an ASN associated with the entity that issued the process creation event, a timestamp of when the process was created, and/or any other information associated with the service, the executed process, and/or the networked computing system. Note that process creation event records may be grouped into a process session record with corresponding process identifiers (e.g., a name, type, and/or identification code of the process and/or a parent process).

Network monitor 108 may be configured to generate a log (also referred to as a "network event log") each time communication over network 120 occurs between resources of system 100. The network event log may be stored in one or more storage nodes of server infrastructure 112 and/or in a data storage external to server infrastructure 112. Each network event log may include a record of network traffic activity in system 100 during a given time period, along with other characteristics associated with the process, as described elsewhere herein.

Malware activity detection engine 110 may be configured to detect malware activity in various ways. For instance, in accordance with an embodiment, malware activity detection engine 110 is configured to analyze logs comprising process creation event records and network event records and determine whether such process creation event records and network event records are indicative of malware activity. In accordance with an embodiment, malware activity detection engine 110 may be configured to analyze certain process creation event records and/or network event records for periodic behavior. In accordance with an embodiment, malware activity detection engine 110 may be implemented in and/or incorporated with Microsoft® Defender for Cloud™ published by Microsoft® Corp, or Microsoft® Sentinel™ published by Microsoft® Corp., etc.

Responsive to detecting potential malware activity, malware activity detection engine 110 may be configured to generate a malware activity alert. Furthermore, and as described with respect to FIGS. 2-4 below, malware activity detection engine 110 may cause a mitigation operation to be performed that mitigates the potential malware activity. Depending on the implementation, the mitigation operation may be performed automatically (e.g., by malware activity detection engine 110, process manager 106, or another component of system 100), manually (e.g., by a user of computing device 102, by an administrator of an enterprise system including computing device 102, or by a developer associated with system 100), or by a combination of automatic and manual mitigation techniques. Examples of mitigation operations include transmitting a message to a user of a computing device (e.g., computing device 102) associated with a network session record that evidences malware activity, terminating a process corresponding to a process session record indicative of the evidenced malware activity, powering down a computing device associated with the network session record that evidences malware activity, blocking network communication (e.g., over network 120) to a computing device associated with the network session record that evidences malware activity, generating an alert to at least one of a developer and/or an administrator associated with system 100. Further mitigation operations are applicable to embodiments, including those described elsewhere herein or as would be understood by a person of skill in the relevant art(s) having benefit of this disclosure.

Furthermore, various remediation steps may be performed as part of a mitigation operation or in response to a mitigation operation being performed. For example, remediation steps may include: reviewing credentials related to potentially compromised user accounts, reviewing activities performed by a service principal associated with the account (e.g., by reviewing process creation event logs and/or network event logs), identifying suspicious activities, changing credentials of a resource and/or subscription associated with a network session record that evidences malware activity, reviewing identity and access management permissions, removing permissions of user account(s) associated with the network session record and/or process session record that evidence malware activity, reviewing alerts in a firewall or other antivirus program related to potentially compromised resources, and/or review activities performed in compromised resources and/or subscriptions (e.g., by reviewing process creation event logs and/or network event logs) and identifying suspicious activities.

Figure 2:
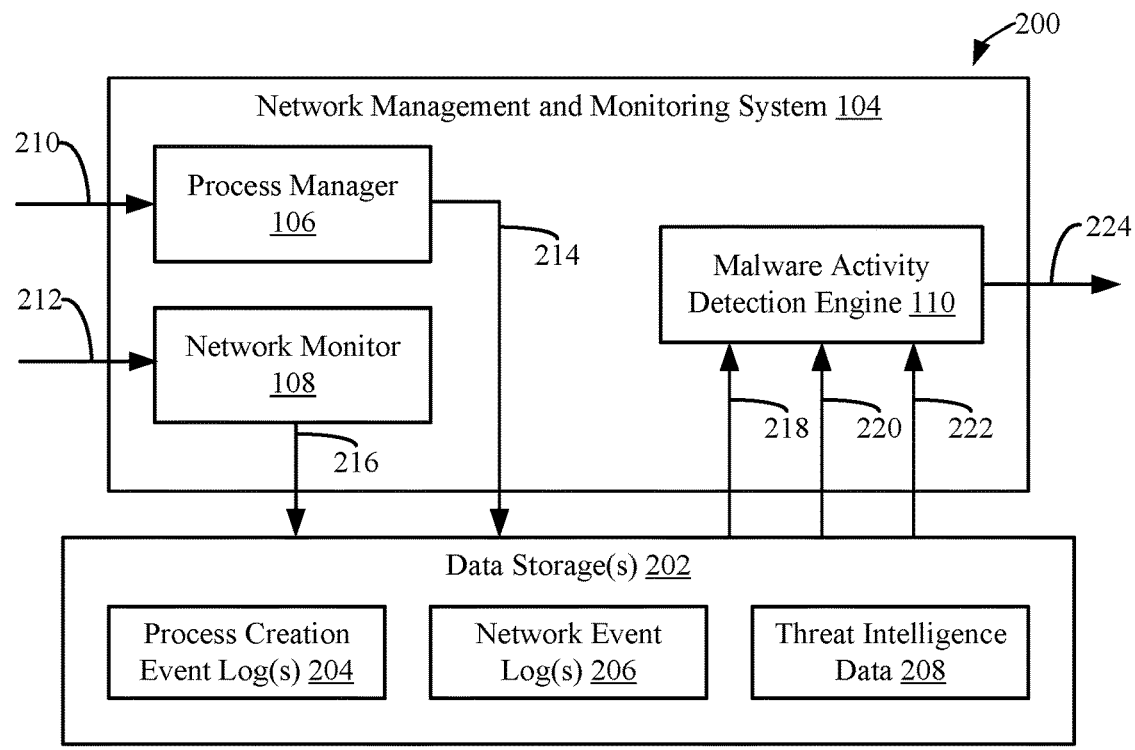
FIG. 2 is a block diagram of the network management and monitoring system of FIG. 1 coupled to data storage, in accordance with an example embodiment.

To help further illustrate the features of network management and monitoring system 104 in accordance with embodiments, FIG. 2 will now be described. In particular, FIG. 2 is a block diagram of a system 200 including network management and monitoring system 104 of FIG. 1 in accordance with an embodiment. As shown in FIG. 2, system 200 includes network management and monitoring system 104, as described above with respect to FIG. 1, and data storage(s) 202. Data storage(s) 202 may include process creation event log(s) 204, network event log(s) 206, threat intelligence data 208, and/or any other information described herein. As shown in FIG. 2, data storage(s) 202 may be external to network management and monitoring system 104; however, it is also contemplated that all or a portion of data storage(s) 202 may be internal to network management and monitoring system 104. For instance, all or a portion of data storage(s) 202 may be internal to a computing device executing either of process manager 106, network monitor 108, and/or malware activity detection engine 110, and/or internal to another computing device of network management and monitoring system 104. Furthermore, data storage(s) 202 may be included in a storage node of clusters 114A and/or 114N of FIG. 1, or in a storage device external to server infrastructure 112.

As shown in FIG. 2, process manager 106 is configured to receive process information 210 from server infrastructure 112 of FIG. 1 (e.g., by network 120) and generate process creation event log 214. Process manager 106 stores process creation event log 214 in process creation event log(s) 204 in data storage(s) 202. Process creation event log 214 may include a process creation event record including metadata associated with a respective process executed by a computing device in system 100 of FIG. 1 in a time period.

As shown in FIG. 2, network monitor 108 is configured to receive network event information 212 from server infrastructure 112 of FIG. 1 (e.g., by network 120) and generate network event log 216. Network monitor 108 stores network event log 216 in network event log(s) 206 in data storage(s) 202. Network event log 216 may include a network event record corresponding to network traffic between two or more resources in system 100 of FIG. 1 in a time period. A network event record includes information that identifies and provides further information on the corresponding event. For instance, a network event record may include resource identifiers of transmitting and/or receiving resources, network addresses of resources associated with the network event, an application identifier that identifies an application associated with the network event, a user identifier associated with a user (e.g., a username by which the user logged into an application) associated with the network event, a type of entity (e.g., a user, a role, a service principal, etc.) that established a network communication channel corresponding to the network event, a type of authentication scheme (e.g., password-based authentication, certificate-based authentication, biometric authentication, token-based authentication, multi-factor authentication, etc.) utilized by the entity that established the network communication channel, an autonomous system number (ASN) associated with the entity that established the network communication channel (e.g., a globally unique identifier that defines a group of one or more Internet protocol (IP) prefixes utilized by a network operator that maintains a defined routing policy), a timestamp of when a network event occurred, the type of communication protocol (e.g., TCP or UDP) of the network event, and/or any other information associated with the network event.

As shown in FIG. 2, malware activity detection engine 110 is configured to access stored process creation event logs 218 of process creation event log(s) 204 and stored network event logs 220 of network event log(s) 206, determine if stored process creation event logs 218 and stored network event logs 220 evidence malware activity, and generate a malware activity alert based on determining that stored process creation event logs 218 and stored network event logs 220 evidence malware activity. In accordance with an embodiment, malware detection engine 108 is configured to cause a mitigation operation to be performed by generating a mitigation signal 224. In accordance with an embodiment, and as will be further discussed below with respect to FIGS. 3-8, malware activity detection engine 110 is configured to generate a process session record set based on stored process creation event logs 218 and generate a network session record based on stored network event logs 220. Furthermore, as will be further discussed below with respect to FIGS. 7 and 8, malware activity detection engine 110 in accordance with an embodiment is configured to generate a network session record based on stored network event logs 220 and stored threat intelligence data 222 of threat intelligence data 208. In accordance with an embodiment, and as will be further discussed below with respect to FIGS. 3 and 4, malware activity detection engine 110 is configured to provide a network session record to a machine learning (ML) model configured to generate an indication of whether the provided network session record evidences malware activity, in response to an indication by the ML model that the provided network session record evidences malware activity, calculate correlation scores by, for each process session record in a process session record set, calculating a correlation score indicative of a correlation score between the provided network session record and the process session record, determine that a correlation score indicates a corresponding process session record is indicative of the evidenced malware activity, generate a malware activity alert in response to said determining that a correlation score indicates a corresponding process session record is indicative of the evidenced malware activity, and cause a mitigation operation to be performed in response to the generated malware activity alert. As will be discussed further below, malware activity detection engine 110 may include the ML model configured to generate an indication of whether the provided network session record evidences malware activity.

Note that a network session record for a network session may indicate various network events associated with the networks session, including communications (e.g., transmission control protocol (TCP) communications, user datagram protocol (UDP) communications, and/or other types of network communications) between resources in the networked computing system. A network session record may be generated by a network monitor such as network monitor 108 of FIG. 1. A network monitor may implement or otherwise use a centralized mechanism (e.g., Azure® Network Watcher in Microsoft® Azure®) to monitor network activity between resources in the networked computing system and generate network event records indicative of the monitored network activity.

As discussed above, malware activity detection engine 110 may cause a mitigation operation to be performed based on a generated malware activity alert by generating mitigation signal 224. For example, mitigation signal 224 may be a notification (e.g., to an administrator) that indicates a potential malware activity has been detected, provides a description of the potential malware activity (e.g., by specifying the process session record that is indicative of the potential malware activity, by specifying process creation events associated with the process session record, specifying the network session record that evidences the potential malware activity, specifying the internet protocol (IP) address(es) from which an associated process creation event was initiated and/or a network communication channel was established, times at which an associated process creation event and/or network event occurred, an identifier of the entity that initiated an associated process creation event and/or established a network communication channel, an identifier of the resource(s) that were accessed or attempted to be accessed, one or more calculated correlation scores, etc.), causes a process corresponding to the process session record indicative of the evidenced malware activity to be terminated, causes a computing device associated with the provided network session record to be powered down, and/or causes network communication (e.g., by network 120) to a computing device associated with the provided network session record to be blocked. The notification may comprise a short messaging service (SMS) message, a telephone call, an e-mail, a notification that is presented via an incident management service, a security tool, etc. Malware activity detection engine 110 may cause a process corresponding to the process session record indicative of the evidenced malware activity to be terminated by sending a command to process manager 106. For example, process manager 106 may manage processes executed with respect to resources (e.g., nodes 116A-116N and 118A-118N) of system 100 of FIG. 1. Responsive to receiving the command, process manager may terminate the process (e.g., by closing an application executing the process on a resource). Malware activity detection engine 110 may cause a computing device associated with the provided network session record to be powered down by sending a command to computing device 102 that causes computing device 102 to power down. Malware activity detection engine 110 may cause network communication to a computing device associated with the provided network session record to be blocked by sending a command to network monitor 108. For example, network monitor 108 may monitor network communication over network 120 between resources of system 100. Responsive to receiving the command, network monitor 108 may block network communications to and/or from one or more resources of system 100. It is noted that notifications may be issued responsive to detecting potential malware activity regardless of whether such activity is actually malware activity. In this way, an administrator may decide for himself or herself as to whether the detected activity is malware activity based on an analysis thereof.

Figure 3:
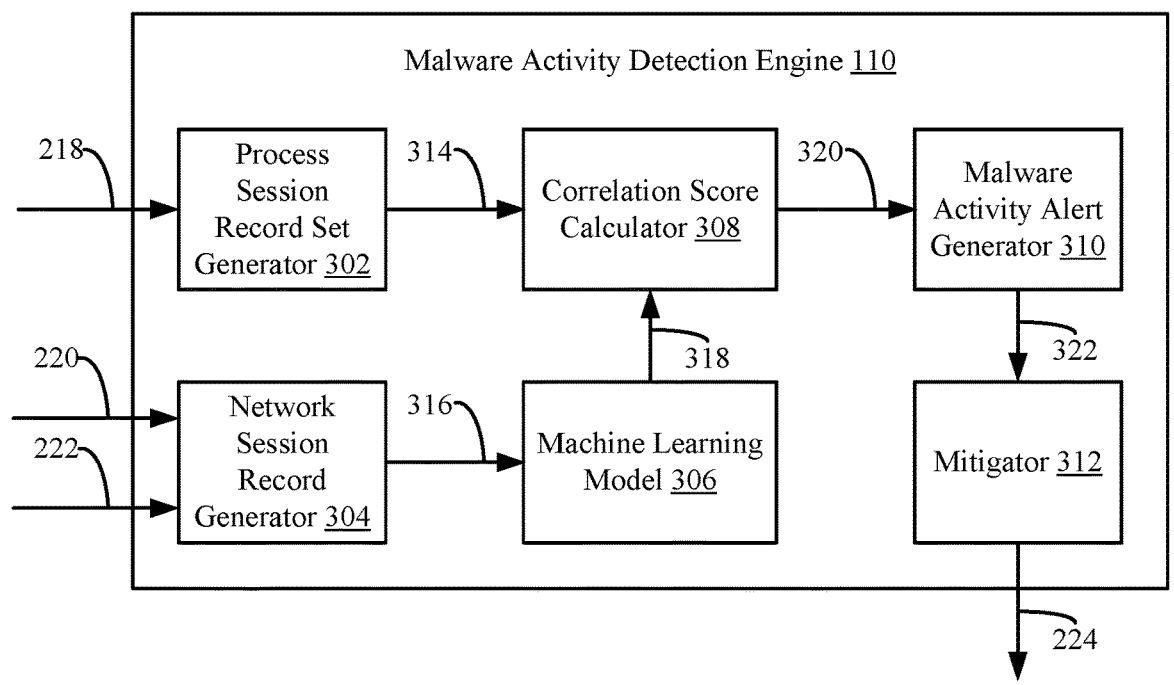
FIG. 3 is a block diagram of the malware activity detection engine of FIG. 1 in accordance with an example embodiment.
Figure 4:
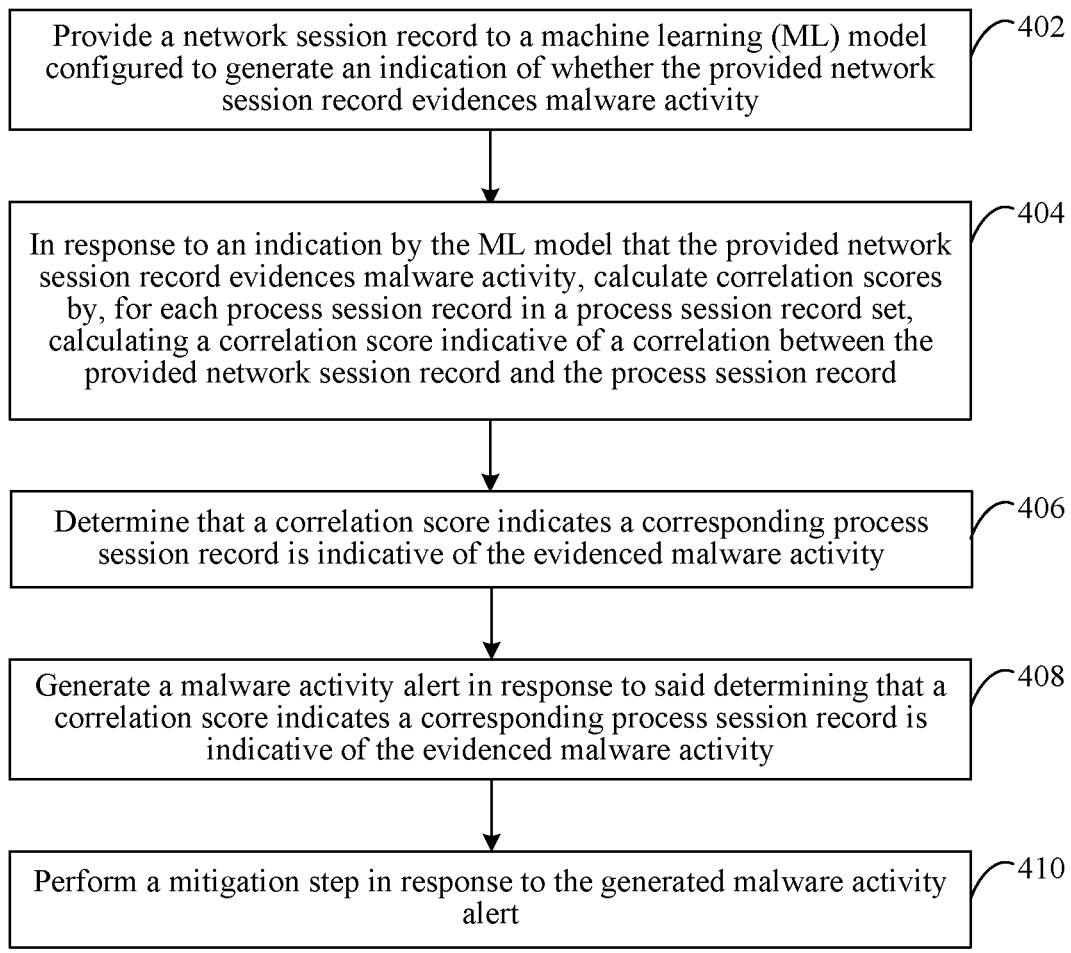
FIG. 4 depicts a flowchart of a process for detecting malware activity for networked computing systems, in accordance with an example embodiment.

Malware activity detection engine 110 may be configured to detect malware activity for networked computing systems in various ways, in embodiments. For example, FIG. 3 is a block diagram of malware activity detection engine 110 of FIG. 1 in accordance with an embodiment. As shown in FIG. 3, malware activity detection engine 110 includes a process session record set generator 302, a network session record generator 304, a machine learning (ML) model 306, a correlation score calculator 308, a malware activity alert generator 310, and a mitigator 312. Depending on the implementation, any of process session record set generator 302, a network session record generator 304, a machine learning (ML) model 306, a correlation score calculator 308, a malware activity alert generator 310, and/or a mitigator 312 may be implemented as services executing on the same computing device. Alternatively, any of the components of malware activity detection engine 110 may be executed on separate computing devices configured to communicate with each other over a network (e.g., one or more wired networks, one or more wireless networks, and/or a combination of wired and wireless networks). For illustrative purposes, malware activity detection engine 110 is described below with respect to FIG. 4. FIG. 4 depicts a flowchart 400 of a process for detecting malware activity for networked computing systems, in accordance with an embodiment. Malware activity detection engine 110 may operate according to flowchart 400 in embodiments. Note that not all steps of flowchart 400 need be performed in all embodiments. Further structural and operational embodiments will be apparent to persons skilled in the relevant art(s) based on the following description of FIGS. 3 and 4.

Flowchart 400 of FIG. 4 begins with step 402. In step 402, a network session record is provided to a ML model configured to generate an indication of whether the provided network session record evidences malware activity. The network session record is indicative of network traffic activity in a computing network in a time period. For example, as shown in FIG. 3, network session record generator 304 is configured to provide network session record 316 to ML model 306, which is configured to determine whether network session record 316 evidences malware activity and, if so, generate indication 318. Alternatively, network session record 316 may be streamed to ML model 306 (e.g., by a network session record generator external to malware activity detection engine 110) or obtained by accessing a data storage configured to store network session records (e.g., by accessing data storage(s) 202 of FIG. 2).

ML model 306 may be configured to generate indication 318 in various ways. For example, ML model 306 may be a supervised ML model trained on network session records of known beaconing malware. In accordance with an embodiment, ML model 306 is configured to analyze timing of network session record 316 to determine if the timing evidences known beaconing malware. For instance, ML model 306 may analyze timing of network traffic activity in a computing network indicated by network session record and determine that the timing of the network traffic activity evidences periodic behavior similar to known beaconing malware. In accordance with another embodiment, ML model 306 is configured to determine a probability that network session record 316 evidences malware activity. In this context, ML model 306 generates indication 318 if the probability that network session record 316 evidences malware activity is above a malware probability threshold.

In accordance with an embodiment, malware activity detection engine 110 is configured to generate the network session record. For example, as shown in FIG. 3, malware activity detection engine 110 includes network session record generator 304. Network session record generator 304 is configured to receive stored network event logs 220 and stored threat intelligence data 222, and generate network session record 316. Network session record generator 304 will be discussed further below with respect to FIGS. 7 and 8.

In step 404, in response to an indication by the ML model that the provided network session record evidences malware activity, correlation scores are calculated for each process session record in a process session record set. Each correlation score is indicative of a correlation between the provided network session record and the process session record. Each process session record in the process session record set corresponds to at least one process executed by a computing device in the computing network in the time period. For example, as shown in FIG. 3, correlation score calculator 308 is configured to, in response to indication 318, calculate correlation scores 320, for each process session record in a process session record set 314, by calculating a correlation score indicative of a correlation between network session record 316 and the process session record. As shown in FIG. 3, process session record set generator 302 is configured to provide process session record set 314 to correlation score calculator 308. Alternatively, process session record set 314 may be streamed to correlation score calculator 308 (e.g., by a process session record set generator external to malware activity detection engine 110) or obtained by accessing a data storage configured to store network session records (e.g., by accessing data storage(s) 202 of FIG. 2).

Correlation score calculator 308 may be configured to calculate correlation scores in various ways. For example, correlation score calculator 308 in accordance with an embodiment is configured to calculate correlation scores based on a proximity of a timing of network session record 316 and a timing of a process session record of process session record set 314. For instance, correlation score calculator may evaluate the time that network events associated with network session record 316 occurred, a pattern of network events associated with network session record 316, the time that process creation events associated with the process session record were executed, a pattern of process creation events associated with the process session record, and/or any other timings of network session record 316 and/or the process session record. Moreover, correlation scores may be calculated based on information other than or in addition to the timings of network session record 316 and process sessions of process session record set 314. For example, correlation score calculator 308 may calculate correlation scores based on metadata and/or other information included in network session record 316 and/or process session record set 314, as described elsewhere herein.

In accordance with an embodiment, malware activity detection engine 110 is configured to generate process session record set 314. For example, as shown in FIG. 3, malware activity detection engine 110 includes process session record set generator 302. Process session record set generator 302 is configured to receive stored process creation event logs 218 and generate process session record set 314. Process session record set generator 302 will be discussed further below with respect to FIGS. 5 and 6.

In step 406, a determination that a correlation score indicates a corresponding process session record is indicative of the evidenced malware activity is made. For example, malware activity alert generator 310 of FIG. 3 is configured to determine that a correlation score of correlation scores 320 indicates a corresponding process session record is indicative of the evidenced malware activity. In accordance with an embodiment, malware activity alert generator 310 determines that the corresponding process session record is indicative of the evidence malware activity by analyzing network session record 316 and the corresponding process session record with respect to the evidenced malware activity. An example analysis will be discussed further below with respect to FIGS. 9 and 10.

In step 408, a malware activity alert is generated in response to said determining that a correlation score indicates a corresponding process session record is indicative of the evidenced malware activity. For example, malware activity alert generator 310 of FIG. 3 is configured to generate malware activity alert 322.

In step 410, a mitigation operation is performed in response to the generated malware activity alert. For example, mitigator 312 of FIG. 3 is configured to generate mitigation signal 224 to cause a mitigation operation to be performed in response to malware activity alert 322. Depending on the mitigation operation to be performed, mitigation signal 224 may cause the mitigation operation to be performed by one or more of malware activity detection engine 110, process manager 106, network monitor 108, computing device 102, another component or subcomponent of system 100, and/or another computing device or application, as described elsewhere herein, or as would be understood by a person of skill in the relevant art(s) having benefit of this disclosure.

Figure 5:
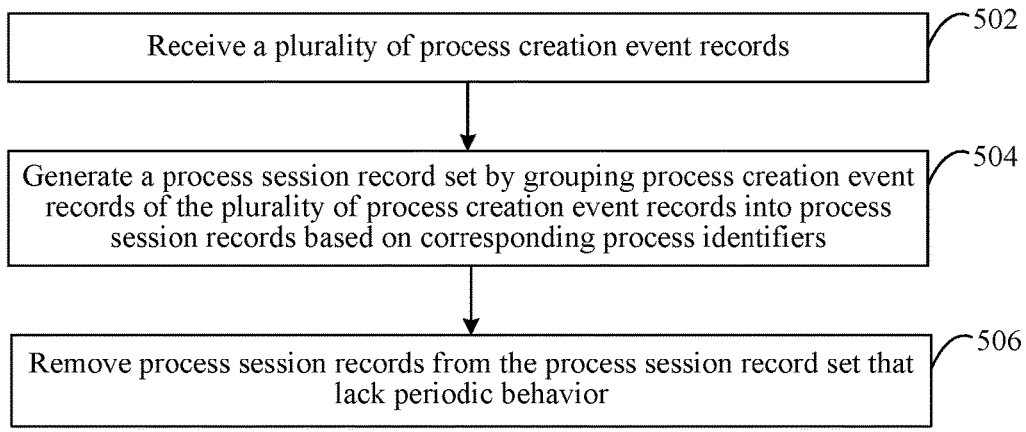
FIG. 5 depicts a flowchart of a process for generating a process session record set, according to an example embodiment.
Figure 6:
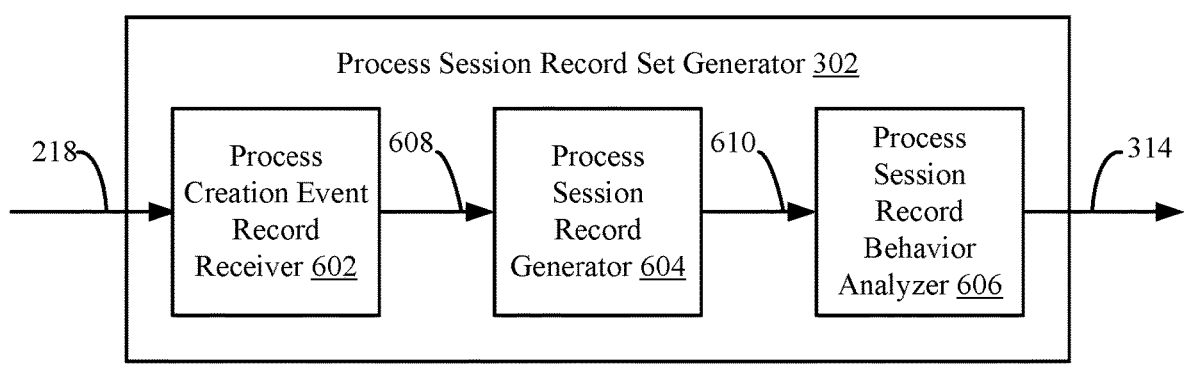
FIG. 6 is a block diagram of the process session record set generator of FIG. 3, according to an example embodiment.

As described above, malware activity detection engine 110 of FIG. 3 may include process session record set generator 302. In accordance with an embodiment, process session record set generator 302 is configured to receive stored process creation event logs 218 and generator process session record set 314. Process session record set generator 302 may be configured to generate process session record set 314 in various ways. For example, FIG. 5 depicts a flowchart 500 of a process for generating a process session record set, according to an example embodiment. Process session record set generator 302 may operate according to flowchart 500 in embodiments. For illustrative purposes, flowchart 500 is described below with respect to FIG. 6. FIG. 6 is a block diagram of process session record set generator 302 of FIG. 3, according to an example embodiment. As shown in FIG. 6, process session record set generator 302 includes a process creation event record receiver 602, a process session record generator 604, and a process session record behavior analyzer 606. Note that not all steps of flowchart 500 need be performed in all embodiments. Further structural and operational embodiments will be apparent to persons skilled in the relevant art(s) based on the following descriptions of FIGS. 5 and 6.

Flowchart 500 begins with step 502. In step 502, a plurality of process creation event records is received. Each process creation event record of the plurality of process creation event records includes metadata associated with a respective process executed by a respective computing device in the computing network in a time period. For example, process creation event record receiver 602 of FIG. 6 is configured to access data storage(s) 202 of FIG. 2 to obtain stored process creation event logs 218 of process creation event log(s) 204, stored process creation event logs 218 including the plurality of process creation event records 608. Alternatively, process creation event records and/or process creation event logs may be streamed to process creation event record receiver 602 (e.g., by process manager 106 of FIG. 1).

As shown in FIG. 6, process creation event record receiver 602 is configured to provide plurality of process creation event records 608 to process session record generator 604. In accordance with an embodiment, process creation record receiver 602 is configured to analyze stored process creation event logs 218, determine process creation event records that correspond to abnormal process creation events, and select the determined process creation event records to generate plurality of process creation event records 608. Abnormal process creation events may include any process creation event that could potentially indicate evidence malware activity (e.g., a rarely executed process or a rarely executed parent process). In accordance with an embodiment, process creation event record receiver 602 may determine a process creation event record corresponds to an abnormal process creation event by comparing an associated process identifier to a list of abnormal process creation events.

In step 504, a process session record set is generated by grouping process creation event records of the plurality of process creation event records into process session records based on corresponding process identifiers. For example, process session record generator 604 of FIG. 6 is configured to group process creation event records of plurality of process creation event records 608 into process session records based on corresponding process identifiers to generate process session record set 610. It is also contemplated herein that process creation event records may be grouped into process session records based on other factors, such as information in metadata included in the process creation event records, as described elsewhere herein.

In step 506, process session records are removed from the process session record set that lack periodic behavior. For example, process session record behavior analyzer 606 of FIG. 6 is configured to remove process session records from process session record set 610 that lack periodic behavior to generate process session record set 314.

Figure 7:
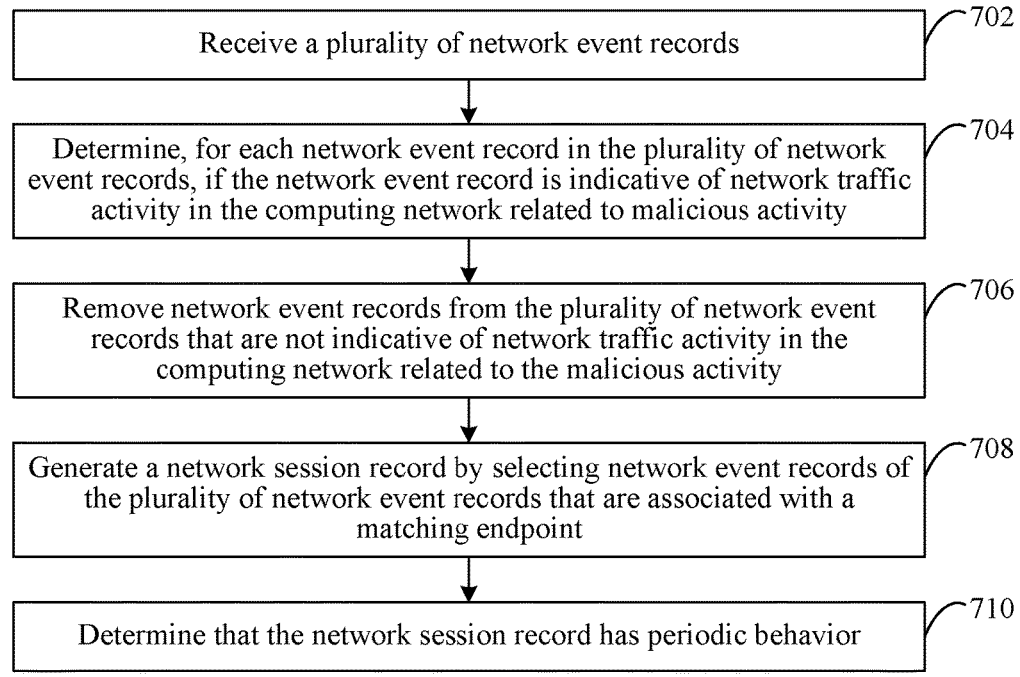
FIG. 7 depicts a flowchart of a process for generating a network session record, according to an example embodiment.
Figure 8:
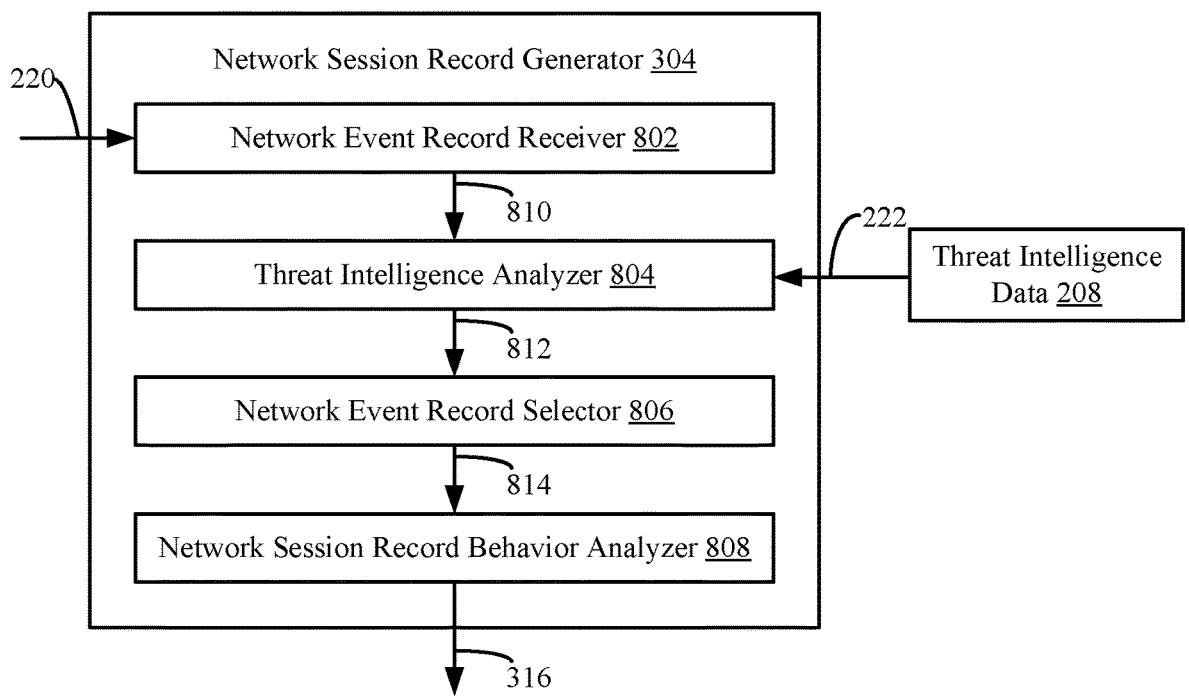
FIG. 8 is a block diagram of the network session record generator of FIG. 3, according to an example embodiment.

As described above, malware activity detection engine 110 of FIG. 3 may include network session record generator 304. In accordance with an embodiment, network session record generator 304 is configured to receive stored process creation event logs 218 and generator network session record 316. Network session record generator 304 may be configured to generate network session record 316 in various ways. For example, FIG. 7 depicts a flowchart 700 of a process for generating a network session record, according to an example embodiment. Network session record generator 304 may operate according to flowchart 700 in embodiments. For illustrative purposes, flowchart 700 is described below with respect to FIG. 8. FIG. 8 is a block diagram of network session record generator 304 of FIG. 3, according to an example embodiment. As shown in FIG. 8, network session record generator 304 includes a network event record receiver 802, a threat intelligence analyzer 804, a network event record selector 806, and a network session record behavior analyzer 808. Note that not all steps of flowchart 700 need be performed in all embodiments. Further structural and operational embodiments will be apparent to persons skilled in the relevant art(s) based on the following descriptions of FIGS. 7 and 8.

Flowchart 700 begins with step 702. In step 702, a plurality of network event records is received. Each network event record of the plurality of network event records corresponds to network traffic between two or more endpoints in the computing network in the time period. For example, network event record receiver 802 of FIG. 8 is configured to access data storage(s) 202 of FIG. 2 to obtain stored network event logs 220 of network event log(s) 206, stored network event logs 220 including plurality of network event records 810. Each network event record of plurality of network event records 810 corresponds to network traffic between two or more resources (e.g., endpoints of resources) in the computing network in the time period. Each network event record may include additional information associated with the network traffic, as described elsewhere herein. Alternatively, network event records and/or network event logs may be streamed to network event record receiver 802 (e.g., by network monitor 108 of FIG. 1).

In step 704, for each network event record in the plurality of network event records, a determination if the network event record is indicative of network traffic activity in the computing network related to malicious activity is made. For example, threat intelligence analyzer 804 of FIG. 8 is configured to determine, for each network event record in plurality of network event records 810, if the network event record is indicative of network traffic activity in system 100 related to malicious activity. As shown in FIG. 8, threat intelligence analyzer 804 is configured to access stored threat intelligence data 222 of threat intelligence data 208 to determine if the network event record is indicative of network traffic activity related to malicious activity. In accordance with an embodiment, threat intelligence data 208 includes historic data of malicious activities (e.g., malware activity or suspected malware activity) in system 100. For example, threat intelligence data 208 may include a list of devices (e.g., suspicious devices) associated with previous malicious activities (e.g., previous malware beaconing activities, previous security breaches, or previous suspected malware beaconing activities). In this context, threat intelligence analyzer 804 is configured to determine if a network event record is indicative of network traffic activity in the computing network related to malicious activity by comparing information of the network event record (e.g., associated resource endpoints or associated computing devices) with the list of devices associated with previous malicious activities in threat intelligence data 208.

In step 706, network event records that are not indicative of network activity in the computing network related to the malicious activity are removed from the plurality of network event records. For example, threat intelligence analyzer 804 of FIG. 8 is configured to remove network event records that are not indicative of network activity in the computing network related to the malicious activity from plurality of network event records 810 to generate plurality of network event records 812.

In step 708, a network session record is generated by selecting network event records of the plurality of network event records that are associated with a matching endpoint. For example, network event record selector 806 of FIG. 8 is configured to select network event records of plurality of network event records 812 that are associated with a matching endpoint to generate network session record 814. Network event record selector 806 may select network event records that are associated with a matching endpoint based on IP addresses, uniform resource identifiers (URIs), and/or any other information in plurality of network event records 812 that may be used to determine which network event records correspond to the same endpoint. While network event record selector 806 is described as generating a single network session record, it is contemplated herein that network session record generators may be configured to generate network session records for each endpoint associated with plurality of network event records 812. Furthermore, a network event record may be included in multiple network session records. For example, network event record selector 806 may be configured to generate a network session record corresponding to multiple endpoints in service infrastructure 112 of FIG. 1. In this example, network event record selector 806 may generate a network session record corresponding to an endpoint of node 116A and a network session record corresponding to an endpoint of node 116N. Each of these network session records may include a (e.g., copy of) network event record corresponding to network traffic activity between the endpoints of node 116A and node 116N.

In step 710, a determination that the network session record has periodic behavior is made. For example, network session record behavior analyzer 808 is configured to determine whether network session record 814 has periodic behavior and, if so, generate network session record 316 (e.g., by passing network session record 814 as network session record 316). In accordance with an embodiment of network session record generator 304 wherein network event record selector 806 is configured to generate a plurality of network session records (e.g., each corresponding to a respective endpoint), network session record behavior analyzer 808 is configured to remove network session records from the plurality of network session records that lack periodic behavior.

Figure 9:
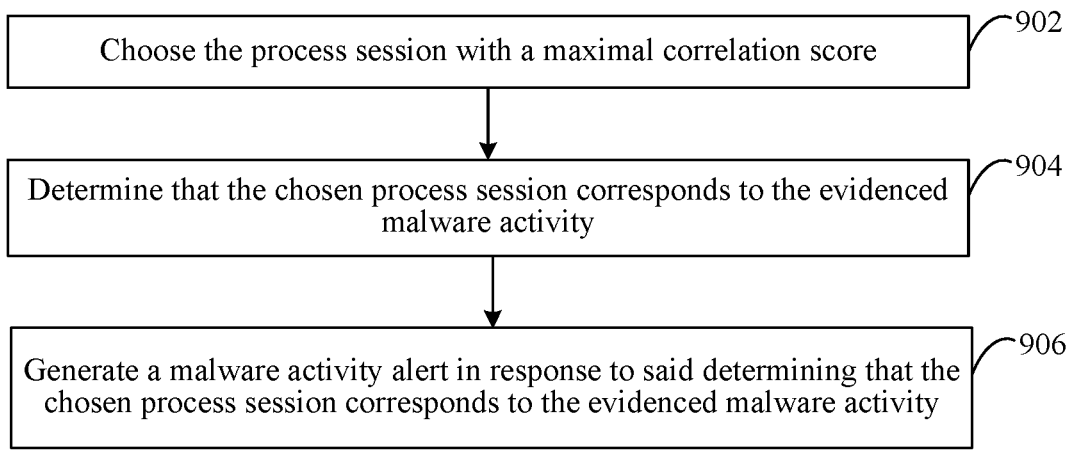
FIG. 9 depicts a flowchart of a process for generating a malware activity alert, according to an example embodiment.
Figure 10:
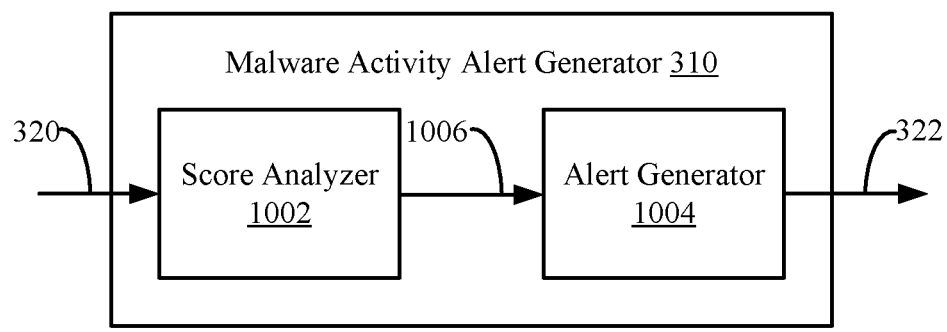
FIG. 10 is a block diagram of the malware activity alert generator of FIG. 3, according to an example embodiment.

Malware activity alert generator 310 may be configured to generate malware activity alert 322 in various ways. For example, FIG. 9 depicts a flowchart of a process for generating a malware activity alert, according to an example embodiment. Malware activity alert generator 310 may operate according to flowchart 900, in embodiments. For illustrative purposes, flowchart 900 is described below with respect to FIG. 10. FIG. 10 is a block diagram of the malware activity alert generator of FIG. 3, according to an example embodiment. As shown in FIG. 10, malware activity alert generator 310 includes a score analyzer 1002 and an alert generator 1004. Note that not all steps of flowchart 900 need be performed in all embodiments. Further structural and operational embodiments will be apparent to persons skilled in the relevant art(s) based on the following descriptions of FIGS. 9 and 10.

Flowchart 900 begins with step 902. In step 902, the process session with a maximal correlation score is chosen. For example, score analyzer 1002 of FIG. 10 is configured to choose the process session of process session record set 314 with the maximal correlation score of correlation scores 320. The maximal correlation score indicates the chosen process session most correlates to network session record 316, with respect to other process session records of process session record set 314.

In step 904, a determination that the chosen process session corresponds to the evidenced malware activity is made. For example, score analyzer 1002 of FIG. 10 is configured to determine whether the process session chosen in step 902 corresponds to the malware activity evidenced by network session record 316, as indicated in step 404 of FIG. 4. If the chosen process session corresponds to the evidenced malware activity, score analyzer 1002 generates indication 1006 and flowchart 900 proceeds to step 906. Otherwise, score analyzer 1002 determines the chosen process session does not correspond to the evidenced malware activity.

Score analyzer 1002 may be configured to determine whether the chosen process session corresponds to the evidenced malware activity in various ways. For example, score analyzer 1002 may determine the maximal correlation score exceeds a malware activity correlation threshold indicative of a likelihood that the chosen process session and network session record 316 correspond to the evidenced malware activity. Alternatively, score analyzer 1002 may determine a probability that the chosen process session corresponds to the evidence malware activity (e.g., based on an analysis of metadata included in the process session record corresponding to the chosen process session). In this context, score analyzer 1002 generates indication 1006 if the probability that the chosen process session corresponds to the evidenced malware activity is above a malware probability process session threshold.

If score analyzer 1002 determines the chosen process session does not correspond to the evidenced malware activity, flowchart 900 may conclude or another process session may be analyzed, depending on the implementation. For instance, score analyzer 1002 may determine another correlation score (other than the maximal correlation score) is above a correlation threshold. For instance, two or more process session records may indicate a high correlation to network session record 316. In this context, score analyzer 1002 determines whether the process session with the other correlation score corresponds to the evidenced malware activity and, if so, flowchart 900 proceeds to step 906. In this way, multiple correlation scores of correlation scores 320 may be analyzed to determine if a process session corresponds to the evidence malware activity. As a non-limiting example, a first correlation score indicates a first process session record corresponding with a valid operation of system 100 of FIG. 1 is highly correlated to network session record 316 and a second correlation score, lower than the first but above a correlation threshold, indicates a second process session record corresponding with a command shell operation piggybacking on the valid operation is highly correlated to network session record 316. In this non-limiting example, score analyzer 1002 determines that the first correlation score is the maximal correlation score, chooses the process session of the first process session record, and determines that the chosen process session does not correspond to the evidenced malware activity. Responsive to determining that the chosen process session does not correspond to the evidenced malware activity, score analyzer 1002 determines that the second correlation score is above the correlation threshold, chooses the process session of the second process session record, and determines that the chosen process session of the second process session record evidences malware activity.

In step 906, a malware activity alert is generated in response to said determining that the chosen process session corresponds to the evidenced malware activity. For example, alert generator 1004 is configured to generate malware activity alert 322 in response to indication 1006. In embodiments, malware activity alert 322 may include information associated with the chosen process session corresponding to indication 1006, the correlation score corresponding to the chosen process session (e.g., the maximal correlation score), correlation scores 320, network session record 316, associated endpoints, and/or any other information associated with the network session corresponding to network session record 316 and/or the process session corresponding to the chosen process session, as described elsewhere herein.

In embodiments, alert generator 1004 may generate malware activity alert 322 in response to indication 1006 or a plurality of indications. For example, score analyzer 1002 may determine a first process session corresponds to evidenced malware activity and, in a subsequent analysis, determine a second process session corresponds to evidenced malware activity. In this example, alert generator 1004 generates malware activity alert 322 including information associated with the first and second process sessions, as well as respective process session records, respective correlation scores, respective correlated network session records, and/or any other information associated with the first and second process sessions.

III. Further Example Embodiments and Advantages

As noted above, systems and devices may be configured in various ways for threat detection for cloud applications. Example embodiments have been described with respect to determining if a network session record evidences malware activity and calculating correlation scores with respect to the network session record and a process session record set; however, it is also contemplated herein that a malware activity detection model may analyze multiple network session records (e.g., a network session record set) and calculate correlation scores with respect to each network session record in the network session record set and each process session record in the process session record set. For example, a ML model may receive a network session record set for network traffic activity in a time period and determine a subset of the network session record set evidence malware activity. In this example, a correlation score calculator may calculate correlation scores for each pairing of network session records in the subset of the network session record set and process session records in a process session record set corresponding to the time period. Furthermore, a malware activity alert generator in accordance with this example may be configured to determine that at least one correlation score indicates a corresponding process session record is indicative of the evidence malware activity and responsively generate a malware activity alert.

In some example embodiments described herein, network session record generators have been described herein as including a threat intelligence analyzer configured to determine if a network event record is indicative of network traffic activity in the computing network related to malicious activity based on threat intelligence data. However, it is also contemplated herein that other components may determine if the network event record is indicative of network traffic activity in the computing network related to malicious activity. For example, a malware detection engine in accordance with an embodiment may include a network event record filter that filters received network event records based on threat intelligence data. Furthermore, a malware activity detection engine may be configured to selectively access network event logs stored in a data storage based on threat intelligence data. Alternatively, a component external to the malware activity detection engine filters logs prior to the malware activity detection engine receiving them.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

IV. Example Computer System Implementation

System 100, computing device 102, network management and monitoring system 104, process manager 106, network monitor 108, malware activity detection engine 110, server infrastructure 112, cluster 114A, cluster 114N, nodes 116A-116N, nodes 118A-118N, data storage(s) 202, process session record set generator 302, network session record generator 304, ML model 306, correlation score calculator 308, malware activity alert generator 310, mitigator 312, flowchart 400, flowchart 500, process creation event record receiver 602, process session record generator 604, process session record behavior analyzer 606, flowchart 700, network event record receiver 802, threat intelligence analyzer 804, network event record selector 806, network session record behavior analyzer 808, flowchart 900, score analyzer 1002, and/or alert generator 1004 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 11:
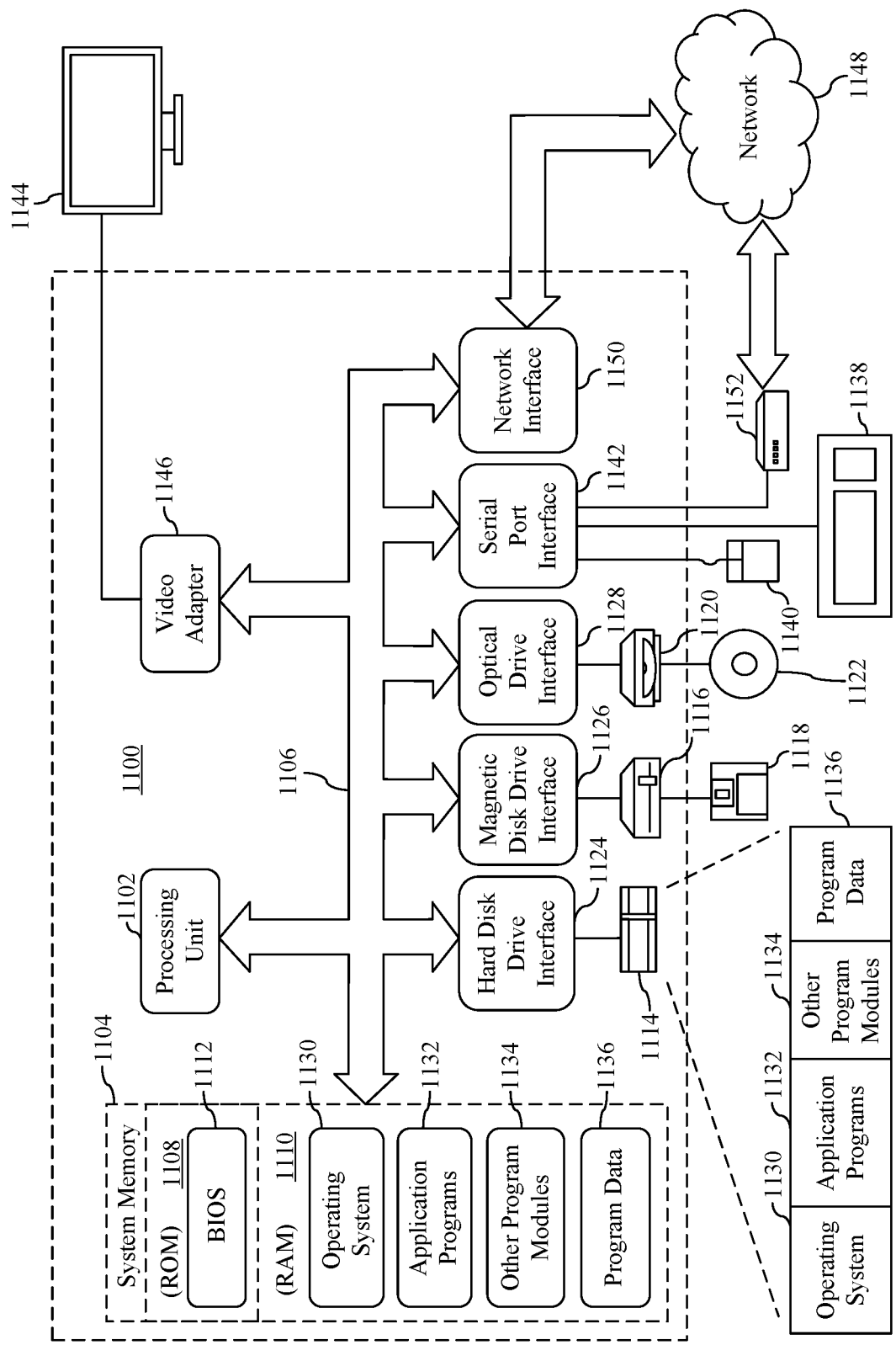
FIG. 11 is a block diagram of an example computing device that may be used to implement embodiments.

FIG. 11 depicts an exemplary implementation of a computer system 1100 ("system 1100" herein) in which embodiments may be implemented. For example, system 1100 may be used to implement system 100, computing device 102, network management and monitoring system 104, process manager 106, network monitor 108, malware activity detection engine 110, nodes 116A-116N, and/or nodes 118A-118N, as described above in reference to FIG. 1. System 1100 may also be used to implement data storage(s) 202 as described above in reference to FIG. 2. System 1100 may also be used to implement process session record set generator 302, network session record generator 304, ML model 306, correlation score calculator 308, malware activity alert generator 310, and/or mitigator 312, as described above in reference to FIG. 3. System 1100 may also be used to implement process creation event record receiver 602, process session record generator 604, and/or process session record behavior analyzer 606, as described above in reference to FIG. 6. System 1100 may also be used to implement network event record receiver 802, threat intelligence analyzer 804, network event record selector 806, and/or network session record behavior analyzer 808, as described above in reference to FIG. 8. System 1100 may also be used to implement score analyzer 1002 and/or alert generator 1004, as described above in reference to FIG. 10. System 1100 may also be used to implement any of the steps of any of the flowcharts of FIGS. 4, 5, 7, and/or 9, as described above. The description of system 1100 provided herein is provided for purposes of illustration and is not intended to be limiting. Embodiments may be implemented in further types of computer systems, as would be known to persons skilled in the relevant art(s).

As shown in FIG. 11, system 1100 includes one or more processors, referred to as processing unit 1102, a system memory 1104, and a bus 1106 that couples various system components including system memory 1104 to processing unit 1102. Processing unit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processing unit 1102 may execute program code stored in a computer readable medium, such as program code of operating system 1130, application programs 1132, other program modules 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random-access memory (RAM) 1110. A basic input/output system 1112 (BIOS) is stored in ROM 1108.

System 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards and drives (e.g., solid state drives (SSDs)), digital video disks, RAMs, ROMs, and other hardware storage media.

A number of program modules or components may be stored on the hard disk, magnetic disk, optical disk, ROM, or RAM. These program modules include an operating system 1130, one or more application programs 1132, other program modules 1134, and program data 1136. In accordance with various embodiments, the program modules may include computer program logic that is executable by processing unit 1102 to perform any or all the functions and features of network management and monitoring system 104, process manager 106, network monitor 108, malware activity detection engine 110, data storage(s) 202, process session record set generator 302, network session record generator 304, ML model 306, correlation score calculator 308, malware activity alert generator 310, mitigator 312, flowchart 400, flowchart 500, process creation event record receiver 602, process session record generator 604, process session record behavior analyzer 606, flowchart 700, network event record receiver 802, threat intelligence analyzer 804, network event record selector 806, network session record behavior analyzer 808, flowchart 900, score analyzer 1002, and/or alert generator 1004 (including any steps of flowcharts 400, 500, 700, and/or 900).

A user may enter commands and information into the system 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processing unit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in, system 1100. Display screen 1144 may display information, as well as being a user interface for receiving user commands and/or other information (e.g., by touch, finger gestures, virtual keyboard, etc.). For example, display screen 1144 may implement an interface (e.g., a user interface configured for use by a user of computing device 102 of FIG. 1, a developer interface configured for use by a developer associated with system 100 of FIG. 1, and/or an administrator interface for use by an administrator associated with system 100 of FIG. 1). The interface may be configured to display information associated with system infrastructure 112, computing device 102, and/or network management and monitoring system 104 as described above with reference to FIG. 1, process information 210, network event information 212, logs of process creation event log 214, process creation event log(s) 204, stored process creation event logs 218, network event log 216, network event log(s) 208, and/or stored network event logs 220, threat intelligence data 208, stored threat intelligence data 222, and/or information included in mitigation signal 224 as described above with reference to FIG. 2, process session record set 314, process creation event records and/or process session records corresponding to process session record set 314, network session record 316, network event records corresponding to network session record 316, indication 318, a malware probability threshold of ML model 306, correlation scores 320, the maximal correlation scores, a chosen process session, a ranked order of correlation scores 320, and/or malware activity alert 322 as described above with reference to FIG. 3, process creation event records 608, process session record set 610, any process session records of process session record set 610, and/or process session records removed by process session record behavior analyzer 606 as described above with reference to FIG. 6, plurality of network event records 810, plurality of network event records 812, and/or network event record 814 as described above with reference to FIG. 8, and/or a malware activity correlation threshold of score analyzer 1002, a malware probability process session threshold of score analyzer 1002, a correlation threshold of score analyzer 1002, and/or indication 1006 as described above with reference to FIG. 10, and/or other information associated with malware activity detection in networked computing systems. In addition to display screen 1144, system 1100 may include other peripheral output devices (not shown) such as speakers and printers.

System 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," and "computer-readable storage medium" are used to refer to physical hardware media such as the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other program modules 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable system 1100 to implement features of embodiments described herein. Accordingly, such computer programs represent controllers of the system 1100.

Embodiments are also directed to computer program products comprising computer code or instructions stored on any computer-readable medium. Such computer program products include hard disk drives, optical disk drives, memory device packages, portable memory sticks, memory cards, and other types of physical storage hardware. In accordance with various embodiments, the program modules may include computer program logic that is executable by processing unit 1102 to perform any or all of the functions and features of network management and monitoring system 104, process manager 106, network monitor 108, and/or malware activity detection engine 110 as described above in reference to FIG. 1, data storage(s) 202 as described above in reference to FIG. 2, process session record set generator 302, network session record generator 304, ML model 306, correlation score calculator 308, malware activity alert generator 310, and/or mitigator 312 as described above in reference to FIG. 3, process creation event record receiver 602, process session record generator 604, and/or process session record behavior analyzer 606 as described above in reference to FIG. 6, network event record receiver 802, threat intelligence analyzer 804, network event record selector, and/or network session record behavior analyzer 808 as described above in reference to FIG. 8, and/or score analyzer 1002 and/or alert generator 1004 as described above in reference to FIG. 10. The program modules may also include computer program logic that, when executed by processing unit 1102, causes processing unit 1102 to perform any of the steps of any of the flowcharts of FIGS. 4, 5, 7, and/or 9, as described above.

V. Additional Exemplary Embodiments

In an embodiment, a system includes one or more processors and one or more memory devices that store program code to be executed by the one or more processors. The program code includes machine learning (ML) model, a correlation score calculator, and a malware activity alert generator. The ML model is configured to receive a network session record and generate an indication of whether the provided network session record evidences malware activity. The network session record is indicative of network traffic activity in a computing network in a time period. The correlation score calculator is configured to, in response to an indication by the ML model that the provided network session record evidences malware activity, calculate correlation scores by, for each process session record in a process session record set, calculating a correlation score indicative of a correlation between the provided network session record and the process session record. Each process session record in the process session record set corresponds to at least one process executed by a computing device in the computing network in the time period. The malware activity alert generator is configured to determine that a correlation score indicates a corresponding process session record is indicative of the evidenced malware activity and generate a malware activity alert in response to determining that a correlation score indicates a corresponding process session record is indicative of the evidenced malware activity.

In an embodiment, the program code further includes a mitigator. The mitigator, in response to a determination a correlation score indicates a corresponding process session record is indicative of the evidenced malware activity, is configured to: transmit a message to a user of a computing device associated with the provided network session record; terminate a process corresponding to at least one process session record of the process session record set; power down a computing device associated with the provided network session record; block network communication to a computing device associated with the provided network session record; or generate an alert to at least one of a developer or an administrator associated with the computing network.

In an embodiment, the program code further includes a process session record set generator configured to receive a plurality of process creation event records. Each process creation event record of the plurality of process creation event records includes metadata associated with a respective process executed by a respective computing device in the computing network in the time period. The process session record set generator is further configured to generate the process session record set by grouping process creation event records of the plurality of process creation event records into process session records based on corresponding process identifiers.

In an embodiment, the program code further comprises a process session record set generator configured to remove process session records from the process session record set that lack periodic behavior.

In an embodiment, the program code further comprises a network session record generator configured to receive a plurality of network event records. Each network event record of the plurality of network event records corresponds to network traffic between two or more endpoints in the computing network in the time period. The network session record generator is further configured to generate the network session record by selecting network event records of the plurality of network event records that are associated with a matching endpoint.

In an embodiment, the network session record generator is further configured to determine, for each network event record in the plurality of network event records, if the network event record is indicative of network traffic activity in the computing network related to malicious activity and remove network event records from the plurality of network event records that are not indicative of network traffic activity in the computing network related to the malicious activity.

In an embodiment, the network session record generator is configured to determine if the network event record is indicative of network traffic activity in the computing network related to malicious activity based on threat intelligence data including a list of suspicious devices associated with previous malicious activities.

In an embodiment, the network session record indicates a network session with periodic behavior.

In an embodiment, to determine that a correlation score indicates a corresponding process session record is indicative of the evidenced malware activity, the malware activity alert generator is configured to choose the process session record with a maximal correlation score and determine that the chosen process session record corresponds to the evidenced malware activity.

In an embodiment, a method is performed by a networked computing system. The method includes providing a network session record to a machine learning (ML) model. The network session record is indicative of network traffic activity in a computing network in a time period. The ML model is configured to generate an indication of whether the provided network session record evidences malware activity. In response to an indication by the ML model that the provided network session record evidences malware activity, correlation scores are calculated by, for each process session record in a process session record set, calculating a correlation score indicative of a correlation between the provided network session record and the process session record. Each process session record in the process session record set corresponds to at least one process executed by a computing device in the computing network in the time period. A determination that a correlation score indicates a corresponding process session record is indicative of the evidenced malware activity is made. A malware activity alert is generated in response to determining that a correlation score indicates a corresponding process session record is indicative of the evidenced malware activity.

In an embodiment, the method further includes performing a mitigation operation in response to the generated malicious activity alert. The mitigation operation includes at least one of: transmitting a message to a user of a computing device associated with the provided network session record; terminating a process corresponding to at least one process session record of the process session record set; powering down a computing device associated with the provided network session record; blocking network communication to a computing device associated with the provided network session record; or generating an alert to at least one of a developer or an administrator associated with the computing network.

In an embodiment, the method further includes receiving a plurality of process creation event records. Each process creation event record of the plurality of process creation event records includes metadata associated with a respective process executed by a respective computing device in the computing network in the time period. The process session record set is generated by grouping process creation event records of the plurality of process creation event records into process session records based on corresponding process identifiers.

In an embodiment, the method further includes removing process session records from the process session record set that lack periodic behavior.

In an embodiment, the method further includes receiving a plurality of network event records. Each network event record of the plurality of network event records corresponds to network traffic between two or more endpoints in the computing network in the time period. The network session record is generated by selecting network event records of the plurality of network event records that are associated with a matching endpoint.

In an embodiment, the method further includes determining, for each network event record in the plurality of network event records, if the network event record is indicative of network traffic activity in the computing network related to malicious activity. Network event records that are not indicative of network traffic activity in the computing network related to the malicious activity are removed from the plurality of network event records.

In an embodiment, the determination if the network event record is indicative of network traffic activity in the computing network related to malicious activity is based on threat intelligence data including a list of suspicious devices associated with previous malicious activities.

In an embodiment, the network session record indicates a network session with periodic behavior.

In an embodiment, the determination that a correlation score indicates a corresponding process session record is indicative of the evidenced malware activity is made by choosing the process session record with a maximal correlation score and determining that the chosen process session record corresponds to the evidenced malware activity.

In an embodiment, a computer-readable storage medium has programming instructions encoded thereon that are executable by one or more processors to perform a method. The method includes providing a network session record to a machine learning (ML) model. The network session record is indicative of network traffic activity in a computing network in a time period. The ML model configured to generate an indication of whether the provided network session record evidences malware activity. In response to an indication by the ML model that the provided network session record evidences malware activity, correlation scores are calculated by, for each process session record in a process session record set, calculating a correlation score indicative of a correlation between the provided network session record and the process session record. Each process session record in the process session record set corresponds to at least one process executed by a computing device in the computing network in the time period. A determination that at least one of the calculated correlation scores is indicative of the evidenced malware activity is made. A malware activity alert is generated in response to determining at least one of the calculated correlation scores is indicative of the evidenced malware activity.

In an embodiment, the determination that at least one of the calculated correlation scores is indicative of the evidenced malware activity is made by choosing the process session record with a maximal correlation score and determining that the chosen process session record corresponds to the evidenced malware activity.

VI. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system comprising:
   a processor; and
   a memory device that stores program code executable by the processor, the program code comprising:
      a machine learning (ML) model configured to:
         receive a network session record, the network session record indicative of a network event associated with a network session in a computing network, the network event occurring at a first timestamp; and
         generate an indication of whether the network session record evidences malware activity;
      a correlation score calculator configured to, in response to an indication by the ML model that the network session record evidences malware activity:
         calculate a first correlation score indicative of a correlation between the network session record and a first process session record, the first process session record indicative of a first process creation event with respect to a first resource of the computing network at a second timestamp, the first correlation score indicative of a proximity of the first timestamp to the second timestamp; and
      a malware activity alert generator configured to:
         determine the first correlation score indicates the first process session record is indicative of the evidenced malware activity; and
         generate a malware activity alert in response to the determination that the first correlation score indicates the first process session record is indicative of the evidenced malware activity.

2. The system of claim 1, wherein the program code further comprises a mitigator, the mitigator, in response to the determination that the first correlation score indicates the first process session record is indicative of the evidenced malware activity, is configured to:
   transmit a message to a user of a computing device associated with the network session record;
   terminate a first process corresponding to the first process session record;
   power down the computing device associated with the network session record;
   block network communication to the computing device associated with the network session record; or
   generate an alert to at least one of a developer or an administrator associated with the computing network.

3. The system of claim 1, wherein the program code further comprises a process session record set generator configured to:
   receive a plurality of process creation event records, each process creation event record of the plurality of process creation event records including metadata associated with a respective process executed by a respective resource of the computing network in a time period comprising the second timestamp; and
   group process creation event records of the plurality of process creation event records into process session records based on corresponding process identifiers, resulting in a process session record set comprising the first process session record.

4. The system of claim 3, wherein the process session record set generator is further configured to:
   remove process session records from the process session record set that lack periodic behavior.

5. The system of claim 1, wherein the program code further comprises a network session record generator configured to:
   receive a plurality of network event records, each network event record of the plurality of network event records corresponding to network traffic between two or more endpoints in the computing network in a time period comprising the first timestamp; and
   generate the network session record by selecting network event records of the plurality of network event records that are associated with a matching endpoint.

6. The system of claim 5, wherein the network session record generator is further configured to:
   determine, for each network event record in the plurality of network event records, if the network event record is indicative of network traffic activity in the computing network related to malicious activity; and
   remove network event records from the plurality of network event records that are not indicative of network traffic activity in the computing network related to the malicious activity.

7. The system of claim 6, wherein the network session record generator is configured to determine if the network event record is indicative of network traffic activity in the computing network related to malicious activity based on threat intelligence data including a list of suspicious devices associated with previous malicious activities.

8. The system of claim 1, wherein the network session record indicates the network session has periodic behavior.

9. The system of claim 1, wherein to determine the first correlation score indicates the process session record is indicative of the evidenced malware activity, the malware activity alert generator is configured to:
  receive the first correlation score and a second correlation score indicative of a correlation between the network session record and a second process session record, the second process session record indicative of a second process creation event with respect to a second resource of the computing network in at a third timestamp, the second correlation score indicative of a proximity of the third timestamp to the first timestamp;
  choose the first process session record from among the first and second process session records, the first correlation score being a maximal correlation score; and
  determine the first process session record corresponds to the evidenced malware activity.

10. A method performed by a networked computing system comprising:
  providing a network session record to a machine learning (ML) model, the network session record indicative of a network event associated with a network session in a computing network, the network event occurring at a first timestamp, the ML model configured to generate an indication of whether the network session record evidences malware activity;
  in response to an indication by the ML model that the network session record evidences malware activity, calculating a first correlation score indicative of a correlation between the network session record and a first process session record, the first process session record indicative of a first process creation event with respect to a first resource of the computing network at a second timestamp, the first correlation score indicative of a proximity of the first timestamp to the second timestamp;
  determining the first correlation score indicates the first process session record is indicative of the evidenced malware activity; and
  generating a malware activity alert in response to said determining the first correlation score indicates the first process session record is indicative of the evidenced malware activity.

11. The method of claim 10, further comprising:
  performing a mitigation operation in response to the generated malicious activity alert, the mitigation operation including at least one of:
    transmitting a message to a user of a computing device associated with the network session record;
    terminating a process corresponding to the first process session record;
    powering down the first resource of the computing network;
    blocking network communication to the first resource of the computing network; or
    generating an alert to at least one of a developer or an administrator associated with the computing network.

12. The method of claim 10, further comprising:
  receiving a plurality of process creation event records, each process creation event record of the plurality of process creation event records including metadata associated with a respective process executed by a respective resource the computing network in a time period comprising the second timestamp; and
  grouping process creation event records of the plurality of process creation event records into process session records based on corresponding process identifiers, resulting in a process session record set comprising the first process session record.

13. The method of claim 12, further comprising:
  removing process session records from the process session record set that lack periodic behavior.

14. The method of claim 10, further comprising:
  receiving a plurality of network event records, each network event record of the plurality of network event records corresponding to network traffic between two or more endpoints in the computing network in a time period comprising the first timestamp; and
  generating the network session record by selecting network event records of the plurality of network event records that are associated with a matching endpoint.

15. The method of claim 14, further comprising:
  determining, for each network event record in the plurality of network event records, if the network event record is indicative of network traffic activity in the computing network related to malicious activity; and
  removing network event records from the plurality of network event records that are not indicative of network traffic activity in the computing network related to the malicious activity.

16. The method of claim 15, wherein said determining if the network event record is indicative of network traffic activity in the computing network related to malicious activity is based on threat intelligence data including a list of suspicious devices associated with previous malicious activities.

17. The method of claim 10, wherein the network session record indicates a network session with periodic behavior.

18. The method of claim 10, wherein said determining the first correlation score indicates the first process session record is indicative of the evidenced malware activity comprises:
  choosing the first process session record from among a plurality of process session records, the first correlation score being a maximal correlation score among correlation scores of the plurality of process session records; and
  determining the first process session record corresponds to the evidenced malware activity.

19. A computer-readable storage medium having programming instructions encoded thereon that are executable by a processor to perform a method, the method comprising:
  providing a network session record to a machine learning (ML) model, the network session record indicative of a network event associated with a network session in a computing network, the network event occurring at a first timestamp, the ML model configured to generate an indication of whether the network session record evidences malware activity;
  in response to an indication by the ML model that the network session record evidences malware activity, calculating a first correlation score indicative of a correlation between the network session record and a first process session record, the first process session record indicative of a first process creation event with respect to a first resource of the computing network at a second timestamp, the first correlation score indicative of a proximity of the first timestamp to the second timestamp;
  determining the first correlation score is indicative of the evidenced malware activity; and
  generating a malware activity alert in response to said determining the first correlation score is indicative of the evidenced malware activity.

20. The computer-readable storage medium of claim 19, wherein said determining the first correlation score is indicative of the evidenced malware activity comprises:
- choosing the first process session record from among a plurality of process session records, the first correlation score being a maximal correlation score among correlation scores of the plurality of process session records; and
- determining the first process session record corresponds to the evidenced malware activity.

* * * * *